Nov. 13, 1956 M. A. HALVERSON 2,770,470
BOAT TRAILER AND ANCHORING STRAP THEREFOR
Filed Feb. 8, 1954
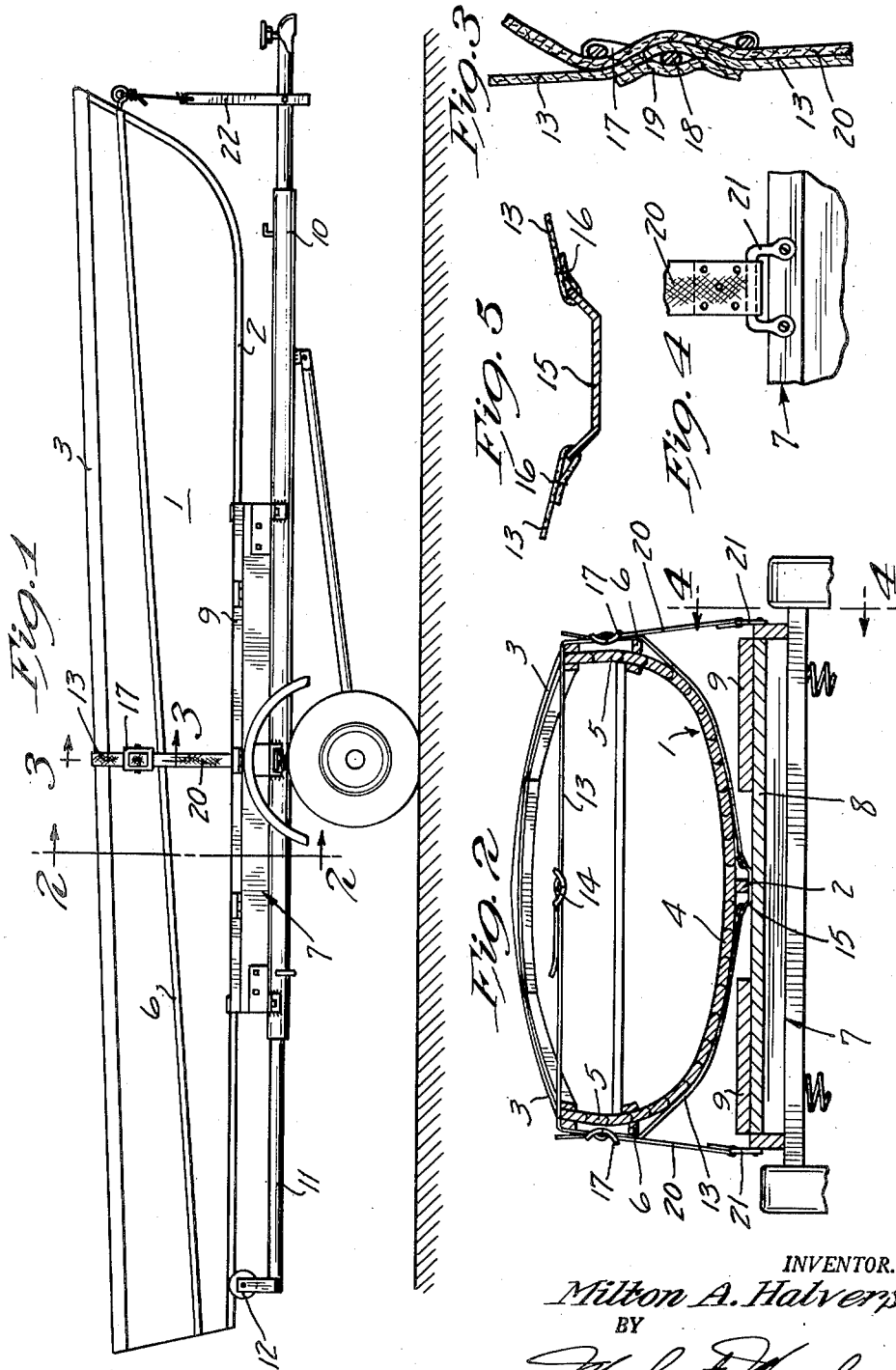
INVENTOR.
Milton A. Halverson
BY
Merchant & Merchant
ATTORNEYS

United States Patent Office 2,770,470
Patented Nov. 13, 1956

2,770,470

BOAT TRAILER AND ANCHORING STRAP THEREFOR

Milton A. Halverson, Brainerd, Minn., assignor to Design-Rite Company, Brainerd, Minn., a corporation of Minnesota Application February 8, 1954, Serial No. 408,728

1 Claim. (Cl. 280—179)

My invention relates to boat trailers and more particularly to strap means for securely anchoring a rowboat or the like to a trailer while the boat is maintained in position upon its keel whereby to totally eliminate scuffing and damage to the bottom and sides of the boat caused by relative movement of the boat with respect to the trailer during transportation.

A common practice in the transporting of boats is to provide a trailer with one or more saddles which conform precisely to the contour or contours of the boat. The chief drawback to this method lies in the fact that the saddles must be individually made to conform to the shape of each given boat. Obviously the costs involved in this method are high. Furthermore, if the saddles do not conform precisely to the contours of the boat, the bottom and sides of the boat will be damaged as the trailer passes over rough roads.

It is well-known that boats are designed to rest upon their keels without damage to the bottom thereof. It is, therefore, my intention to produce means whereby a boat may be securely strapped in position whereby the keel thereof will be received and supported upon a flat platform, with the bottom and sides thereof completely out of contact with any portion of the trailer which might scuff, wear, or otherwise cause damage to the same.

Still more specifically, it is the object of my invention to provide flexible strap means whereby a boat may be retained in an upright position on a trailer with its keel only in contact with a relatively flat platform.

A still further object of my invention is the provision of a trailer and strap means therefor, of the class above described, which is relatively inexpensive to produce, which is rugged in construction, and durable in use.

A still further object of my invention is the provision of strap means, of the class immediately above described, which is easy to attach to a boat trailer, which is easy to operate, and which is completely safe.

The above and still further objects of my invention will become apparent from the following detailed specification, appended claim, and attached drawings.

Referring to the drawings wherein like characters indicate like parts throughout the several views:

Fig. 1 is a view in side elevation of a boat trailer with my novel strap means attached thereto;

Fig. 2 is a view partly in transverse section and partly in end elevation, as seen from the line 2—2 of Fig. 1;

Fig. 3 is an enlarged fragmentary sectional view as seen substantially from the line 3—3 of Fig. 1;

Fig. 4 is an enlarged fragmentary view in side elevation as seen substantially from the line 4—4 of Fig. 2; and Fig. 5 is an enlarged sectional view of the keel-receiving center section of my novel strap means.

Referring with greater particularity to the drawings, the numeral 1 indicates in its entirety a conventional rowboat, the keel of which is identified by the numeral 2, the gunwales on opposite sides by the numeral 3, the bottom by 4, the sides by 5, and the splash rails by 6.

The trailer, identified in its entirety by the numeral 7 is of the type disclosed in my co-pending application, Serial No. 377,614, filed August 31, 1953, now Patent No. 2,720,413, and titled "Multi-Purpose Trailer." However it will be noted that, because of the novel strap means here employed, the boat guiding and supporting flanges 19 of said co-pending application are unnecessary and have been omitted. The bottom of the trailer 7 is identified by the numeral 8, whereas the hinged side members, which swing upward and outward to form a box-type trailer, are identified by the numeral 9. The telescopically extensible drawbar is identified by the numeral 10 whereas the telescopically-mounted, rotatable keel-supporting bar is identified by the numeral 11. The keel-receiving roller on the end of the bar 11 is identified by the numeral 12.

For the purpose of securely tying down the boat 1 to the trailer 7 with the keel 2 receivable on the transverse center of the bottom 8, as shown in Figs. 1 and 2, I provide a flexible girth strap 13 which is adapted to encompass and tightly embrace the boat at approximately its longitudinal center. As shown in Fig. 2, the girth strap 13 is provided at one of its ends with a buckle 14, preferably of the friction type. Also preferably, and as shown, the girth strap 13, at its longitudinal center, is provided with a generally U-shaped metallic link 15 which is adapted to receive therein the keel 2 and which, as shown in Fig. 2, is interposed between the bottom of the keel 2 and the bottom 8 of the trailer 7. In this manner, undue wear on the flexible girth strap by the keel 2 which bears upon the bottom 8 of the trailer 7, is prevented. Fig. 5 shows the yoke 15 in section and illustrates the manner of attachment thereto of the girth strap 13. The overlapped ends of the girth strap 13, after passing through openings in opposite ends of the yoke 15, may be secured together, as indicated at 16, in any suitable manner such as sewing, riveting, or the like.

Attention is directed to the fact that the buckle 14 is positioned over the bottom 4 of the boat between the gunwales 3 when the yoke 15 is interposed between the keel 2 and the bottom 8 of the trailer 7. This is important because it affords the operator adequate space to tighten the girth strap 13. Anchoring buckles 17, also preferably of the friction type, are rigidly secured to the girth strap 13 one on each side of the yoke 15. As shown in Figs. 1 and 2, the buckles 17 are adapted to be positioned immediately below the gunwales 3 on opposite sides of the boat 1. As shown in Fig. 3, the transverse pivot pins 18 of the buckle 17 are secured to the girth strap 13 by means of interposing same therebetween and a supplementary strap-like section 19. Rivets or other suitable means secure the elements 13 and 19 together.

Anchoring straps 20 are secured at their lower ends to opposite sides of the trailer, preferably, and as shown, through the medium of hasps or the like 21. The upper ends of the anchoring straps 20 are adapted to be cooperatively received one each within one of the anchoring buckles 17. Note that the lower ends of the anchoring straps 20 are secured to the trailer 7 at points which are a greater distance apart than the width of the boat 1 at its longitudinal center whereby the straps 20 will diverge downwardly when the upper ends thereof are in engagement with the anchoring buckle 17, see Fig. 2, thus insuring the maximum anchoring leverage. When the girth strap 13 is adequately tightened as shown in Fig. 2, and the anchoring straps 20 are also caused to be taut, as there shown, the boat 1 will ride upon its keel 2 for great distances without shifting with respect to the bottom 8 of the trailer 7. Although forming no part of this invention, it will be noted that the rearwardly projected portion of the keel 2 is received within the grooved roller 12 carried by the bar 11 whereas the front end of the boat is tied down to the extensible drawbar 10 by means of a strap 22.

My invention has been thoroughly tested and found to be completely satisfactory for the accomplishment of the above objects and while I have shown a preferred embodiment thereof, it should be specifically understood that the invention is capable of modification within the scope of the appended claim.

What I claim is:

In a boat trailer having a horizontal platform adapted to receive and support the keel of a boat placed thereon, a friction buckle-equipped flexible girth strap adapted to encompass and tightly embrace a boat intermediate its ends, friction anchoring buckles secured to the intermediate portion of said girth strap one on each side of its longitudinal center and adapted to be positioned on opposite sides of said boat below the gunwales thereof when said first-mentioned buckle is between said gunwales and in overlying relationship to the bottom of said boat, and anchoring straps secured to opposite sides of said trailer intermediate its front and rear ends, the upper end portions of said anchoring straps having cooperative engagement one each with one of said anchoring buckles, said girth strap being provided with a generally U-shaped metallic link adapted to be interposed between the platform of said trailer and the keel of said boat and to receive said keel therein.

References Cited in the file of this patent
UNITED STATES PATENTS

| | | |
|---|---|---|
| 1,779,887 | Melanson | Oct. 28, 1930 |
| 2,437,736 | Good | Mar. 16, 1948 |
| 2,571,213 | Cunningham et al. | Oct. 16, 1951 |